United States Patent
Wolf et al.

(10) Patent No.: US 9,153,257 B1
(45) Date of Patent: Oct. 6, 2015

(54) WRITE HEAD HAVING REDUCED DIMENSIONS

(71) Applicant: Seagate Technology LLC, Cupertino, CA (US)

(72) Inventors: John M. Wolf, Maple Grove, MN (US);
Jianhua Xue, Maple Grove, MN (US);
Kevin Heim, Eden Prairie, MN (US);
Kirill Rivkin, Edina, MN (US);
Huaqing Yin, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/796,875

(22) Filed: Jul. 10, 2015

Related U.S. Application Data

(63) Continuation of application No. 14/495,986, filed on Sep. 25, 2014, now Pat. No. 9,082,427.

(51) Int. Cl.
*G11B 5/39* (2006.01)

(52) U.S. Cl.
CPC ........................ *G11B 5/39* (2013.01)

(58) Field of Classification Search
CPC ...... G11B 5/1278; G11B 5/3123; G11B 5/17; G11B 5/315; G11B 5/3116; G11B 5/3146; G11B 2005/001
USPC .................................................. 360/123.06
See application file for complete search history.

(56) References Cited

U.S. PATENT DOCUMENTS

| | | | |
|---|---|---|---|
| 3,891,995 A | 6/1975 | Hanazono et al. |
| 4,631,612 A | 12/1986 | Shiiki et al. |
| 4,652,957 A | 3/1987 | Schewe et al. |
| 4,675,766 A | 6/1987 | Schewe |
| 4,703,382 A | 10/1987 | Schewe et al. |
| 6,038,106 A | 3/2000 | Aboaf et al. |
| 6,195,233 B1 | 2/2001 | Akiyama et al. |
| 6,798,615 B1 | 9/2004 | Litvinov et al. |
| 6,954,331 B2 | 10/2005 | Crawford et al. |
| 6,984,333 B2 | 1/2006 | Matono et al. |
| 7,394,621 B2 | 7/2008 | Li et al. |
| 7,515,381 B2 | 4/2009 | Baer et al. |
| 7,535,674 B2 | 5/2009 | Lee et al. |
| 7,567,409 B2 | 7/2009 | Lee et al. |
| 7,656,612 B2 | 2/2010 | Sasaki et al. |
| 7,672,079 B2 | 3/2010 | Li et al. |
| 7,679,862 B2 | 3/2010 | Nakamoto et al. |
| 8,004,792 B2 | 8/2011 | Biskeborn et al. |

(Continued)

FOREIGN PATENT DOCUMENTS

| | | |
|---|---|---|
| JP | 62165718 A | 1/1989 |
| JP | 2130710 | 5/1990 |
| JP | 2628854 B2 | 7/1997 |

*Primary Examiner* — Mark Blouin
(74) *Attorney, Agent, or Firm* — HolzerIPLaw, PC

(57) ABSTRACT

A write head having reduced dimensions. In one implementation, the write head has a main pole having a leading side and a trailing side, a leading yoke on the leading side of the main pole, and a coil wrapped around the main pole and the leading yoke. The coil on the leading side and the leading yoke having a distance of no greater than 300 nm therebetween, and the coil on the trailing side and the main pole having a distance of no greater than 350 nm therebetween. In an alternate implementation, the write head has a trailing yoke, with the coil on the trailing side and the trailing yoke having a distance of no greater than 350 nm therebetween.

16 Claims, 11 Drawing Sheets

(56) References Cited

U.S. PATENT DOCUMENTS

| | | | |
|---|---|---|---|
| 8,035,922 B2 | 10/2011 | Lille et al. | |
| 8,054,580 B2 | 11/2011 | Kimura et al. | |
| 8,125,732 B2 | 2/2012 | Bai et al. | |
| 8,179,636 B1 | 5/2012 | Bai et al. | |
| 8,218,263 B2 | 7/2012 | Allen et al. | |
| 8,264,792 B2 | 9/2012 | Bai et al. | |
| 8,339,736 B2 | 12/2012 | Gao et al. | |
| 8,345,384 B1 | 1/2013 | Sasaki et al. | |
| 8,390,962 B2 | 3/2013 | Gunder et al. | |
| 8,405,930 B1 | 3/2013 | Li et al. | |
| 8,416,528 B1 | 4/2013 | Sasaki et al. | |
| 8,472,135 B1 | 6/2013 | Kusukawa et al. | |
| 8,472,146 B2 | 6/2013 | Brown et al. | |
| 8,537,494 B1 | 9/2013 | Pan et al. | |
| 8,547,659 B1 | 10/2013 | Bai et al. | |
| 8,582,236 B2 | 11/2013 | Linville et al. | |
| 8,605,386 B1 | 12/2013 | Ohtake et al. | |
| 8,649,125 B1 | 2/2014 | Basu et al. | |
| 8,665,561 B1 | 3/2014 | Knutson et al. | |
| 8,670,212 B2 * | 3/2014 | Bai et al. | 360/125.15 |
| 8,749,919 B2 | 6/2014 | Sasaki et al. | |
| 8,786,983 B1 * | 7/2014 | Liu et al. | 360/123.02 |
| 8,804,280 B2 | 8/2014 | Lopusnik et al. | |
| 8,817,418 B1 | 8/2014 | Matsuo et al. | |
| 8,842,387 B1 * | 9/2014 | Horide et al. | 360/110 |
| 8,879,208 B1 * | 11/2014 | Liu et al. | 360/125.3 |
| 8,917,480 B2 | 12/2014 | Liu et al. | |
| 2002/0071208 A1 | 6/2002 | Batra et al. | |
| 2002/0135943 A1 | 9/2002 | Nishizawa et al. | |
| 2004/0047079 A1 | 3/2004 | Ito et al. | |
| 2004/0169958 A1 | 9/2004 | Krounbi et al. | |
| 2006/0002021 A1 | 1/2006 | Li et al. | |
| 2008/0231994 A1 | 9/2008 | Kimura et al. | |
| 2008/0316631 A1 | 12/2008 | Gao et al. | |
| 2008/0316643 A1 | 12/2008 | Linville et al. | |
| 2012/0050915 A1 | 3/2012 | Hong et al. | |
| 2012/0147503 A1 | 6/2012 | Zou et al. | |
| 2012/0170154 A1 | 7/2012 | Sasaki et al. | |
| 2013/0003226 A1 | 1/2013 | Bai et al. | |
| 2013/0242432 A1 | 9/2013 | Meloche et al. | |
| 2014/0307348 A1 | 10/2014 | Min et al. | |
| 2014/0313614 A1 | 10/2014 | Hsiao et al. | |

* cited by examiner

WRITE HEAD HAVING REDUCED DIMENSIONS

CROSS-REFERENCE

This application is a continuation of U.S. application Ser. No. 14/495,986 filed Sep. 25, 2014, issued as U.S. Pat. No. 9,082,427, the entire disclosures of which are incorporated herein for all purposes.

BACKGROUND

A disc drive is an example of a data storage system that uses magnetic fields for writing and reading data. Transducers write information to and read information from data surfaces of the discs. In one example, transducers include a recording or write head for generating a magnetic field that aligns the magnetic moments of a magnetic medium to represent desired bits of data. Magnetic recording heads include both longitudinal and perpendicular recording techniques. Perpendicular recording is a form of magnetic recording in which magnetic moments representing bits of data are oriented perpendicularly to the surface of the recording layer. Perpendicular magnetic write heads typically include main and return poles that are separated to form a write gap and extend from pole tips located at an air-bearing surface (ABS) to a back gap region. A coil is included to generate magnetic flux through the main and return poles in response to a current conducted through the coil. The main pole tip focuses the magnetic flux density such that the magnetic fields interact with the magnetic medium to orient its magnetic moments in an up or down direction.

As the desire for higher data rate and higher data density increases in magnetic memory storage, great challenges are placed on magnetic write head design.

SUMMARY

Implementations described and claimed herein provide a write head comprising a write pole, a yoke and a coil structure, the dimensions of the write head, particularly between the coil structure, the yoke and the write pole being reduced in relation to conventional write heads.

One particular implementation is a write head comprising a main pole having a leading side and a trailing side, a leading yoke on the leading side of the main pole, and a coil structure present on both sides of the main pole and the leading yoke. The coil structure on the leading side and the leading yoke have a distance of no greater than 300 nm therebetween, and the coil structure on the trailing side and the main pole have a distance of no greater than 350 nm therebetween.

Another particular implementation is a write head comprising a main pole having a leading side and a trailing side, a leading yoke on the leading side of the main pole, a trailing yoke on the trailing side of the main pole, and a coil structure present on both sides of the main pole, the leading yoke, and the trailing yoke. The coil structure on the leading side and the leading yoke have a distance of no greater than 300 nm therebetween, and the coil structure on the trailing side and the trailing yoke have a distance of no greater than 350 nm therebetween.

Other particular implementations provided in this disclosure are methods of making a write head having reduced dimensions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

DETAILED DESCRIPTION

Figure 1:
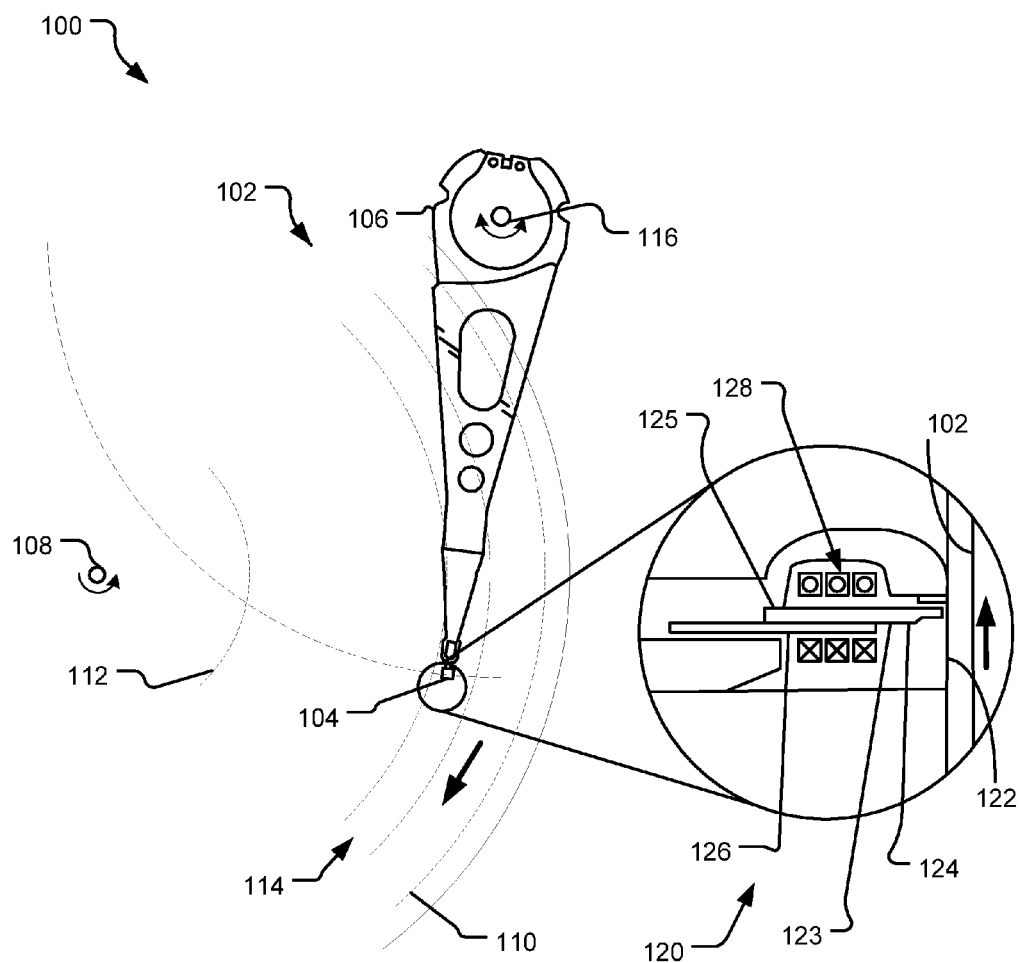
FIG. 1 is a schematic top view of storage device having an example write head implemented on an end of an actuator assembly.

As indicated above, the desire for higher data rate and higher areal density results in great challenges in designing the magnetic write head. In perpendicular recording, the write head 'writes' information into the recording media by switching writer's magnetic field from one polarity to the other through driving current waveform change. When recording at high data rate (HDR), the switching speed increases. Normally, the write field magnitude will be degraded and magnitude variation will be enlarged with data rate increase. These not only cause poorer media saturation, but also cause worse transition sharpness between bits. In addition, since the write field bubble expansion is slower at the track edge than in the track center, the transition curvature along the cross-track direction will become larger with data rate increase. All these HDR effects will cause a poorer signal-to-noise ratio (SNR).

The basic requirements to writer design for high areal density recording (high linear density and high track density) include strong writeability, confining the expansion of the field in the down-track and cross-track directions, and reducing any erase field. With the increased track density, reducing the physical width of the trailing edge of the write pole tip directly helps reduce track pitch. However, even with the same write field magnitude, reducing the write pole width could cause larger track inflation and adjacent track fringing field could increase. The large adjacent track fringing field will degrade the write field cross-track gradient and worsen track edge erase band. This in turn will limit the further track density push. Confining the field in the cross-track direction, for example with a side shield, will improve cross-track field gradient and reduce the erase band. Track density can get big improvement. One reliability issue is during transition writing, magnetization's dynamic activity in side shield will cause side track erasure field that will ruin the recording information in side tracks. The present disclosure provides writer designs, or write head designs, that can significantly increase the write speed (e.g., faster switching) and improve driving current-write field efficiency, thus benefiting HDR performance. The write designs have a shorter magnetic field rise time while decreasing the coil power needed to achieve the magnetic field. The lower coil power will correspond to lower erasure field, benefiting writer's reliability.

An implementation of a recording head disclosed herein includes a magnetic coil wrapped around the write pole and the yoke, with the physical distance between the coil structure, the yoke and the write pole being reduced in relation to conventional write heads.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a storage device 100 having an example recording head structure implemented on an end of an actuator assembly. Specifically, FIG. 1 illustrates a top plan view of an implementation of a magnetic media or disc 102 with a transducer head 104 situated on an end of an actuator assembly 106. Disc 102 rotates about a disc axis of rotation 108 during operation in the direction indicated. Further, disc 102 includes an outer diameter 110 and inner diameter 112 between which are a number of data tracks 114, illustrated by dotted lines. Data tracks 114 are substantially circular and are made up of regularly spaced patterned bits.

Information may be written to and read from the patterned bits on data tracks 114 through the use of actuator assembly 106, which rotates during a data track 114 seek operation about an actuator axis of rotation 116. Transducer head 104, mounted on actuator assembly 106 at an end distal from the actuator axis of rotation 116, flies in close proximity above the surface of disc 102 during disc operation. Transducer head 104 includes a recording head including a read pole for reading data from track 114 and a write pole for writing data to track 114.

FIG. 1 also illustrates an expanded view of a partial cross-sectional configuration of transducer head 104, particularly, of a write head portion 120 of transducer head 104. Write head 120 is illustrated with its air bearing surface (ABS) 122 near magnetic media or disc 102. The direction of rotation of disc 102 is indicated in the expanded view.

Specifically, write head 120 includes a main pole 124 (also referred to as a write pole) configured to write data to disc 102 by a magnetic field. Main pole 124 is made of a ferromagnetic material such as, but not limited to, iron (Fe), cobalt (Co), nickel (Ni), and combinations thereof. For example, main pole 124 can comprise an alloy such as, but not limited to, iron and cobalt (FeCo), iron and nickel (FeNi), cobalt, iron and nickel (CoFeNi), iron and aluminum nitride (FeAlN), iron and tantalum nitride (FeTaN), cobalt, iron and boron (CoFeB), cobalt and iron nitride (CoFeN), and the like. Main pole 124 can have a thickness, taken parallel to the ABS 122, of, e.g., 250 nm to 700 nm.

Main pole 124 defines a leading edge side 123 and a trailing edge side 125; leading edge side 123 engages disc 102 prior to main pole 124 engaging disc 102 as disc 102 spins, and trailing edge side 125 engages disc 102 after main pole 124 engages disc 102 as disc 102 spins. In some implementations, the features on leading edge side 123 are called the "bottom" or "lower" and the features on trailing edge side 125 are called the "top" or "upper." Write head 120 also includes a yoke 126 on the leading edge side 123. Yoke 126 facilitates switching of the magnetic flux in main pole 124 and assists in channeling the magnetic flux towards trailing edge side 125 of main pole 124. Yoke 126 is made of a high magnetic moment material, such as iron cobalt (FeCo), cobalt iron nickel (CoFeNi), and the like. Yoke 126 can have a thickness, taken parallel to the ABS 122, of, e.g., 450 nm to 700 nm.

Write head 120 is energized using a coil structure 128 around main pole 124 and yoke 126 having a plurality of turns. Coil structure 128 may be a helical coil wrapped around main pole 124 and yoke 126, or coil structure 128 may be composed of planar coils present on leading edge side 123 and trailing edge side 125. Coil structure 128 is made of an electrically conductive material such as, but not limited to, copper (Cu), silver (Ag), gold (Au), and combinations thereof. Coil structure 128 generates a magnetic field to rotate the magnetization in yoke 126 and main pole 124 from behind ABS 122; the rotation or switching happens when a magnetic domain wall propagates to the ABS 122.

Coil structure 128 of write head 120 has a plurality of turns present on leading edge side 123 and trailing side edge 125 of pole 124. Coil structure 128 defines a "core", which is the magnetic materials between coil structure 128 and main pole 124; in this implementation, write head 120 has a lower core that includes main pole 124 and yoke 126, and an upper core that includes main pole 124. The distance between coil structure 128 on leading edge side 123 to yoke 126 is no greater than 300 nm, in some implementations no greater than 250 nm, and in other implementations no greater than 200 nm. The distance between coil structure 128 on trailing edge side 125 to main pole 124 is no greater than 350 nm, in some implementations no greater than 300 nm, and in other implementations no greater than 250 nm.

The configuration provides an efficient writer, reducing both magnetic rise time (the time to fully reverse saturate a pole) and erasure flux. As described above, a magnetic domain wall propagates to the ABS 122 from main pole 124, the domain wall having been instigated in main pole 124 by coil structure 128. By providing a shorter distance between coil structure 128 and main pole 124, there will be less coil flux leaking into the space, more flux concentrating to the main pole, and the strength of the magnetic flux experienced by main pole 124 is increased. Also as described above, yoke 126 facilitates switching of the magnetic flux. By providing a shorter distance between yoke 126 and main pole 124, the effect from yoke 126 is magnified, increasing the strength of the flux in main pole 124, which in turn increases the domain wall propagation to the ABS 122 and thus the switching speed. The configuration also requires less writing power, thus providing overall electrical and thermal-mechanical improvements. Additional details of write heads having reduced dimensions are provided in below.

Figure 2:
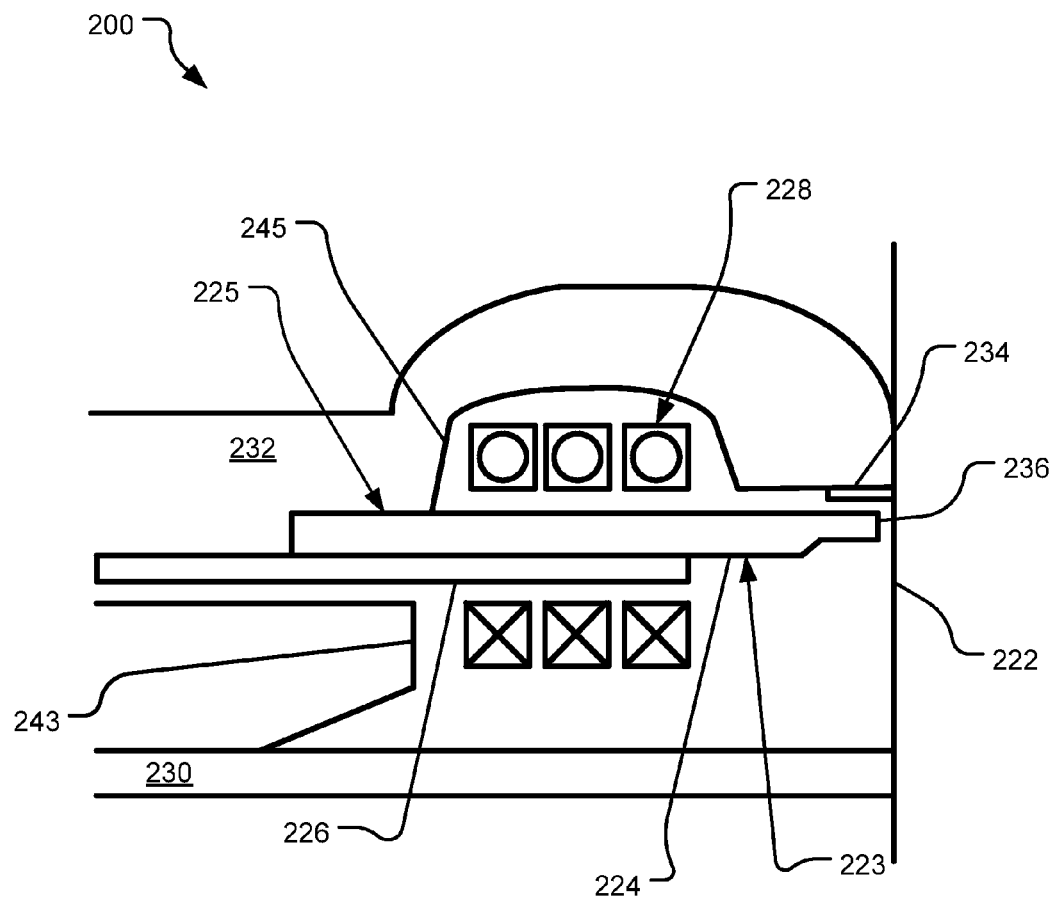
FIG. 2 is a schematic cross-sectional side view of another example write head.

FIG. 2 illustrates a more detailed view of the write head from FIG. 1. In FIG. 2, write head 200 has an air bearing surface (ABS) 222, a main pole 224 (also referred to as the write pole) defining a leading edge side 223 and a trailing edge side 225. Main pole 224 has a pole tip 236 proximate the ABS 222. On leading edge side 223 of main pole 224 is a yoke 226 recessed from pole tip 236. A coil structure 228 is on leading edge side 223 and on trailing edge side 225 of main pole 224 and yoke 226. In the illustrated implementation, the distal end of yoke 226 (closest to the ABS 222) is essentially aligned with the distal edge of coil structure 228 (closest to the ABS 222), although in other implementations the yoke and coil structure edge are not aligned.

Write head 200 has a first return pole (RP1) 230 on leading edge side 223 of pole 224 and a second return pole (RP2) 232 on trailing edge side 225 of pole 224. RP2 232 includes a front shield 234 extending towards main pole 224 at the ABS 222; front shield 234 may be integral with RP2 232 or may be a separate element, either the same or different material than RP2 232. A first back via 243 connects main pole 224 to RP1 230 by way of yoke 226 and a second back via 245 connects main pole 224 to RP2 232.

Coil structure 228 is present between main pole 224 and the leading side, RP1 230 and between main pole 224 and the trailing side, RP2 232. In an implementation, coil structure 228 is formed as a helical coil wrapped around main pole 224; in another implementation, coil structure 228 has a set of planar coils or turns present on leading edge side 123 of main pole 224 and a set of planar coils or turns present on trailing edge side 225. Each turn of coil structure 228 is connected in series with the other turns of coil structure 228. However, any suitable configuration of coil structure 228 can be utilized; for example, coil structure 228 can comprise a plurality of coils (e.g., two coils) both forming separate electric circuits. In one implementation, an insulating material (not shown), such as alumina ($Al_2O_3$), electrically insulates coil structure 228 from main pole 224 and RP1 230 and from main pole 224 and RP2 232. It is the thickness of this insulating material that is reduced, thus allowing decreased distance between coil structure 228 and main pole 224.

As indicated above, write head 200 has certain dimensions greatly reduced over previous write head designs. For example, the distance between coil structure 228 (particularly, the inner edge) on leading edge side 223 to yoke 226 is no greater than 300 nm, in some implementations no greater than 250 nm, and in other implementations no greater than 200 nm. Additionally, in write head 200, the distance between coil structure 228 (particularly, the inner edge) on trailing edge side 225 to main pole 224 is no greater than 350 nm, in some implementations no greater than 300 nm, and in other implementations no greater than 250 nm. These areas, between coil structure 228 to yoke 226 and between coil structure 228 to main pole 224, are typically filled with non-conducting, typically electrically insulating or dielectric material, such as alumina ($Al_2O_3$). Thus, in other words, the thickness of the insulating or dielectric material between coil structure 228 (particularly, the inner edges) and yoke 226 is no greater than 300 nm, in some implementations no greater than 250 nm, and in other implementations no greater than 200 nm. Additionally, in write head 200, the thickness of the insulating or dielectric material between coil structure 228 (particularly, the inner edges) to main pole 224 is no greater than 350 nm, in some implementations no greater than 300 nm, and in other implementations no greater than 250 nm.

Figure 3:
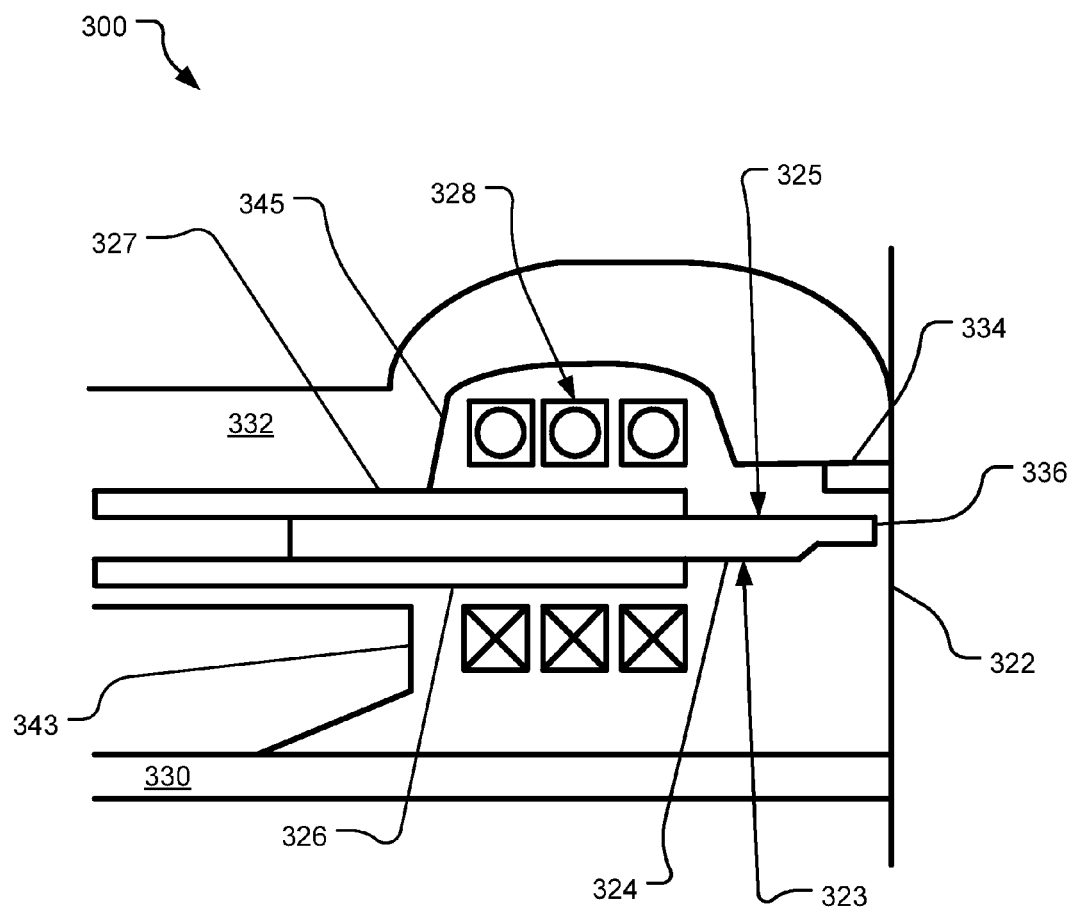
FIG. 3 is a schematic cross-sectional side view of another example write head.

FIG. 3 illustrates another implementation of a write head having reduced dimensions. Unless indicated otherwise, the elements of FIG. 3 are the same as or similar to like elements of FIG. 2.

In FIG. 3, a write head 300 has an air bearing surface (ABS) 322, a main pole 324 (also referred to as the write pole) defining a leading edge side 323 and a trailing edge side 325. Main pole 324 has a pole tip 336 proximate the ABS 322. On leading edge side 323 of main pole 324 is a leading yoke 326 recessed from pole tip 336, and on trailing edge side 325 of main pole 324 is a trailing yoke 327. A coil structure 328 is present around main pole 324, leading yoke 326 and trailing yoke 327. In the illustrated implementation, both the distal end of leading yoke 326 and the distal end of trailing yoke 327 are essentially aligned with the distal edge of coil structure 328, although in other implementations the yoke(s) and coil structure edge are not aligned. The thickness of leading yoke 326 may be the same as, greater than, or less than the thickness of trailing yoke 327 (the thickness being measured parallel to the ABS 322). In some implementations, where leading yoke 326 is thicker than trailing yoke 327, a ratio of the thickness of leading yoke 326 to the thickness of trailing yoke 327 is at least 1.5:1 (or, 3:2), in some implementations at least 2:1. One suitable range of ratios is 2:1 to 4:1.

Such a write head design, having leading yoke 326 and trailing yoke 327, improves the efficiency of the coil structure by rebalancing the magnetic flux. For adequate performance of a write head, in general, the magnetic flux is drawn towards the trailing edge of the head, i.e., the direction of flux closure through the trailing shield. By adjusting the ratio of thicknesses between leading yoke 326 and trailing yoke 327, a portion of the flux is rebalanced. In particular, having leading yoke 326 thicker than the trailing yoke 327 by a factor of at least 1.5 moves a portion of flux towards the leading edge, reducing the magnetic flux leakage and corresponding erasure events on the trailing edge without sacrificing the overall performance.

Write head 300 has a first return pole (RP1) 330 on leading edge side 323 of pole 324 and a second return pole (RP2) 332 on trailing edge side 325 of pole 324. RP2 332 includes a front shield 334 extending towards main pole 324 at the ABS 322. A first back via 343 connects main pole 324 to RP1 330 by way of leading yoke 326 and a second back via 345 connects main pole 324 to RP2 332 by way of trailing yoke 327.

Coil structure 328 is present between leading yoke 326 and RP1 330 and between trailing yoke 327 and RP2 332. In an implementation, coil structure 328 is formed as a helical coil wrapped around main pole 324, leading yoke 326 and trailing yoke 327. In another implementation, coil structure 328 has a set of planar coils or turns present on leading edge side 323 of leading yoke 326 and a set of planar coils or turns present on trailing edge side 325 of trailing yoke 327. Each turn of coil structure 328 is connected in series with the other turns of coil structure 328. However, any suitable configuration of coil structure 328 can be utilized; for example, coil structure 328 can comprise a plurality of coils (e.g., two coils) both forming separate electric circuits.

Write head 300 has certain dimensions greatly reduced over previous write head designs. For example, the distance between coil structure 328 (particularly, the inner diameter edge) to leading yoke 326 is no greater than 300 nm, in some implementations no greater than 250 nm, and in other implementations no greater than 200 nm. Additionally, in write head 300, the distance between coil structure 328 (particularly, the inner diameter edge) to trailing yoke 327 is no greater than 350 nm, in some implementations no greater than 300 nm, and in other implementations no greater than 250 nm. These distances, from coil structure 328 to leading yoke 326 and from coil structure to trailing yoke 327, are typically filled with non-conducting, typically electrically insulating, or dielectric material, such as alumina ($Al_2O_3$). Thus, in other words, the thickness of the insulating or dielectric material between coil structure 328 (particularly, the inner edge) and leading yoke 326 is no greater than 300 nm, in some implementations no greater than 250 nm, and in other implementations no greater than 200 nm. Additionally, in write head 300, the thickness of the insulating or dielectric material between coil structure 328 (particularly, the inner edge) to trailing yoke 327 is no greater than 350 nm, in some implementations no greater than 300 nm, and in other implementations no greater than 250 nm.

Figure 4:
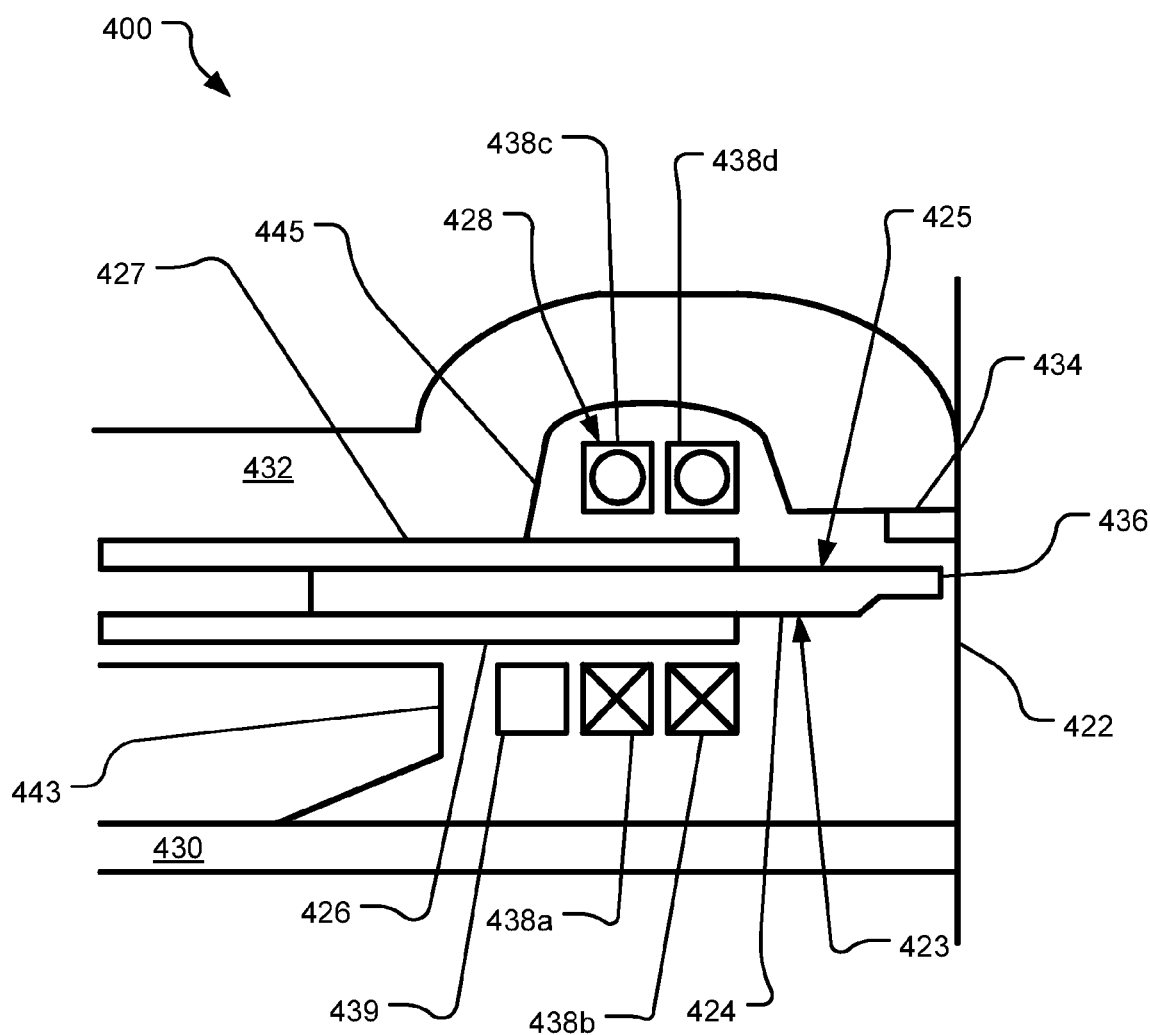
FIG. 4 is a schematic cross-sectional side view of yet another example write head.

FIG. 4 illustrates another implementation of a write head having reduced dimensions. Unless indicated otherwise, the elements of FIG. 4 are the same as or similar to like elements of FIG. 2 and FIG. 3, whether called out or not.

In FIG. 4, a write head 400 has an air bearing surface (ABS) 422, a main pole 424 defining a leading edge side 423 and a trailing edge side 425. Main pole 424 has a pole tip 436 proximate the ABS 422. On leading edge side 423 of main pole 424 is a leading yoke 426 recessed from pole tip 436 and on trailing edge side 425 of main pole 424 is a trailing yoke 427. A coil structure 428 is present around main pole 424, leading yoke 426 and trailing yoke 427. In the illustrated implementation, both the distal end of leading yoke 426 and the distal end of trailing yoke 427 are essentially aligned with the distal edge of coil structure 428, although in other implementations the yoke(s) and coil structure edge are not aligned.

Coil structure 428 has a plurality of turns 438, in this implementation, two turns 438a, 438b on leading edge side 423 and two turns 438c, 438d on trailing edge side 425. These turns 438 may be helically wound around main pole 424, leading yoke 426 and trailing yoke 427, or may be composed of turns or planar coils present on each side of main pole 424, leading yoke and trailing yoke 427. These turns 438 are "active" turns, in that they are formed of electrically conducting material and configured to conduct a current, thus creating a magnetic flux. In the illustrated implementation, coil structure 428 also includes, on leading edge side 423, a dummy turn 439, which typically does not conduct current. Dummy turn 439 may be physically connected to active turns 438 or may be physically separated from any and all active turns 438. If dummy turn 439 is of a material that conducts current, turn 439 is not electrically connected to coil structure 428.

Write head 400 has a first return pole (RP1) 430 on leading edge side 423 of pole 424 and a second return pole (RP2) 432 on trailing edge side 425 of pole 424. RP2 432 includes a front shield 434 extending towards main pole 424 at the ABS 422. A first back via 443 connects main pole 424 to RP1 430 by way of leading yoke 426 and a second back via 445 connects main pole 424 to RP2 432 by way of trailing yoke 427. Coil structure 428 is present between leading yoke 426 and RP1 430 and between trailing yoke 427 and RP2 432.

Example dimensions for write head 400 include a distance between coil structure 428 (particularly, the inner edge) to leading yoke 426 no greater than 300 nm, in some implementations no greater than 250 nm, and in other implementations no greater than 200 nm. Additional example dimensions, for write head 400, include a distance between coil structure 428 (particularly, the inner edge) to trailing yoke 427 no greater than 350 nm, in some implementations no greater than 300 nm, and in other implementations no greater than 250 nm. These areas, between coil structure 428 to leading yoke 426 and between coil structure to trailing yoke 427, are filled with non-conducting, typically electrically insulating material or dielectric material, such as alumina ($Al_2O_3$). Thus, in other words, the thickness of the insulating or dielectric material between coil structure 428 (particularly, the inner edge) and leading yoke 426 is no greater than 300 nm, in some implementations no greater than 250 nm, and in other implementations no greater than 200 nm. Additionally, in write head 400, the thickness of the insulating or dielectric material between coil structure 428 (particularly, the inner edge) to trailing yoke 427 is no greater than 350 nm, in some implementations no greater than 300 nm, and in other implementations no greater than 250 nm.

All of the write heads described above, write heads 120, 200, 300, 400, and variations thereof can be fabricated by generally conventional methods, including plating, deposition, etching, milling, and other conventional processing techniques, but with specific steps in order to be able to create the required elements and dimensions.

One implementation of this disclosure is a reduced lower core dimension, with the thickness of the dielectric material (e.g., $Al_2O_3$) between the leading side coil structure and yoke being no more than 300 nm. FIGS. 5A to 5I schematically illustrate a general process to form a write head having a reduced dimension lower core. Various layers of material are sequentially applied (e.g., deposited) and removed (e.g., patterned, etched, milled, etc.) to form the desired features; in general, the process is done in a generally bottom to top sequence, with the lower features (e.g., the leading side return pole) formed before upper or higher features (e.g., the main pole or write pole).

Figure 5A:
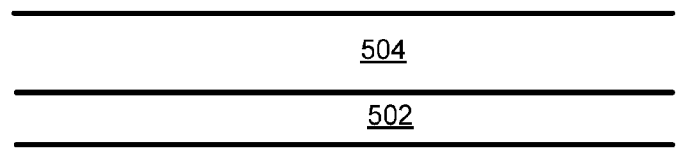
FIGS. 5A through 5I are schematic cross-sectional side views of a stepwise process for making an example write head having reduced dimensions on the leading or bottom side.
Figure 5B:
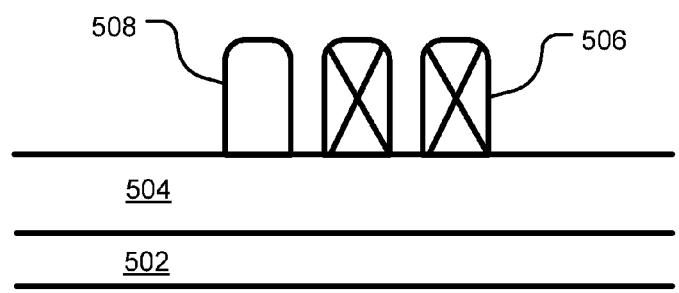
Figure 5C:
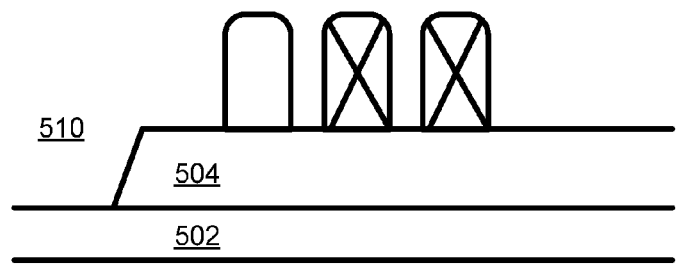
Figure 5D:
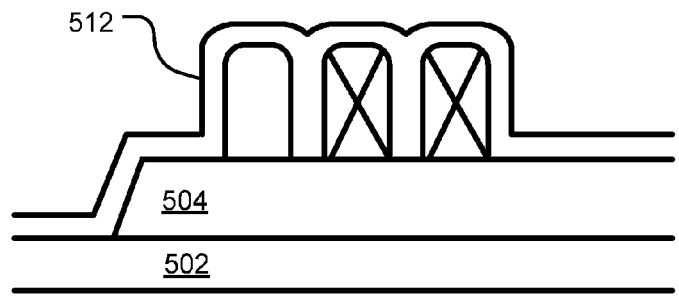
Figure 5E:
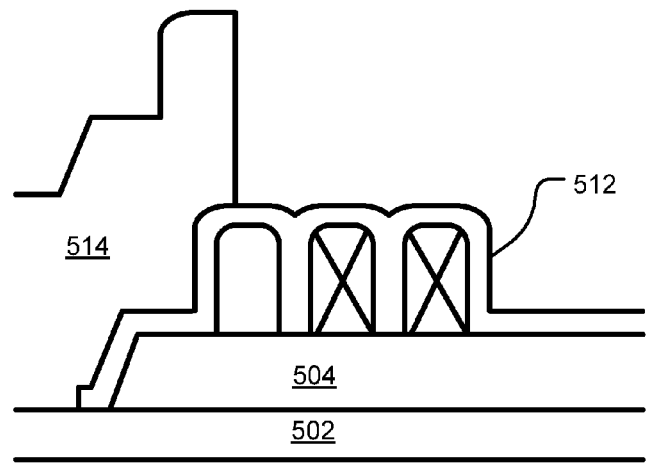
Figure 5F:
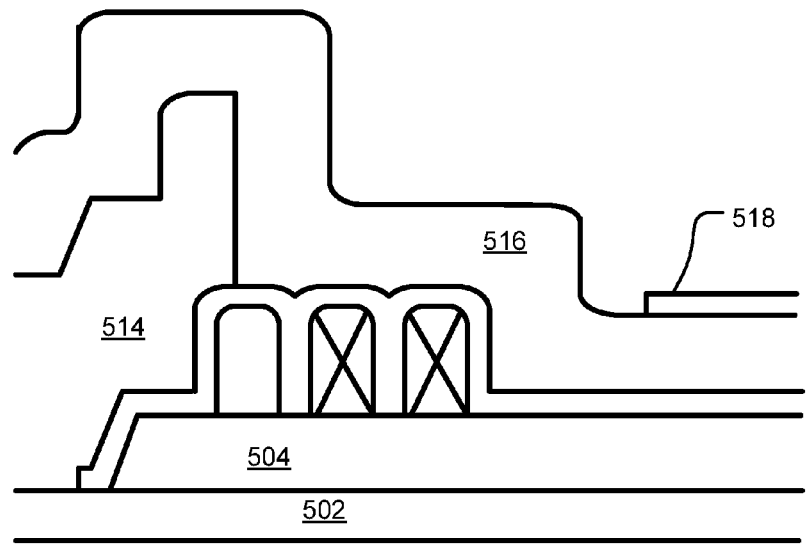

Turning to FIG. 5A, a first magnetic layer 502 (which will be the first return pole) is formed (e.g., deposited) and dielectric layer 504 is applied over layer 502. A layer of electrically conductive material 506, which will eventually form the coil structure, is applied in FIG. 5B and patterned thicker than its design target. In some implementations, a conductive material 508, to form a dummy coil, is included. In FIG. 5C, a portion of dielectric material 504 is patterned and removed to create a back edge 510. In FIG. 5D, dielectric material 512 is deposited to fill the area between the turns of the coil structure. In FIG. 5E, a magnetic material 514 is applied and patterned to a thickness greater than the sum of the thickness target of the eventual coil structure and the thickness of dielectric material 504. Next, in FIG. 5F, additional dielectric material 516 is deposited to a thickness just greater than the difference of the thickness target of the eventual coil structure and the dielectric material 504. A stop layer 518 (e.g. amorphous carbon) is patterned on the wafer plane associated with the desired coil structure target thickness.

Figure 5G:
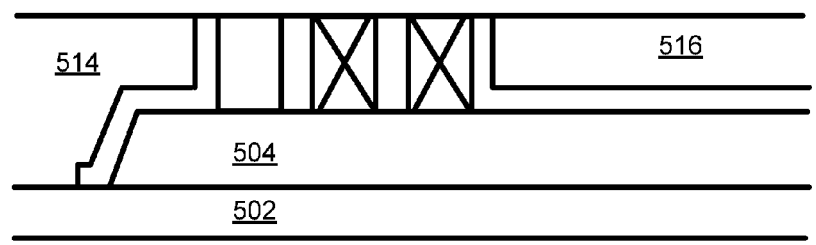

In FIG. 5G, the resulting structure is planarized (e.g., CMP'd (chemical-mechanical polishing)) to achieve the desired dimension (thickness) of the coil structure. At this point, the electrically conductive material 506 (and optionally the material 508) that will form the coil structure, the magnetic material 514 that will form the back via and dielectric 512, 516 are all exposed at the surface.

Figure 5H:
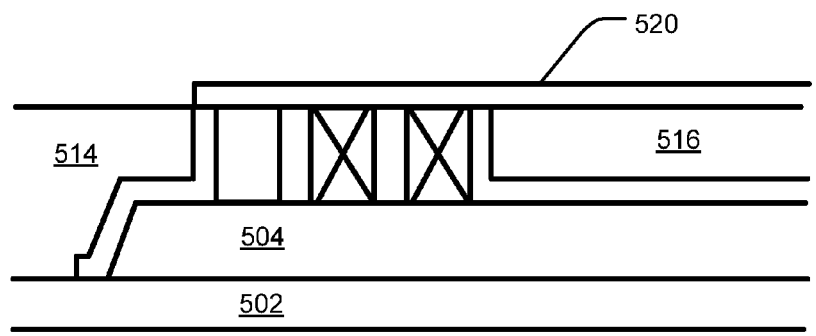
Figure 5I:
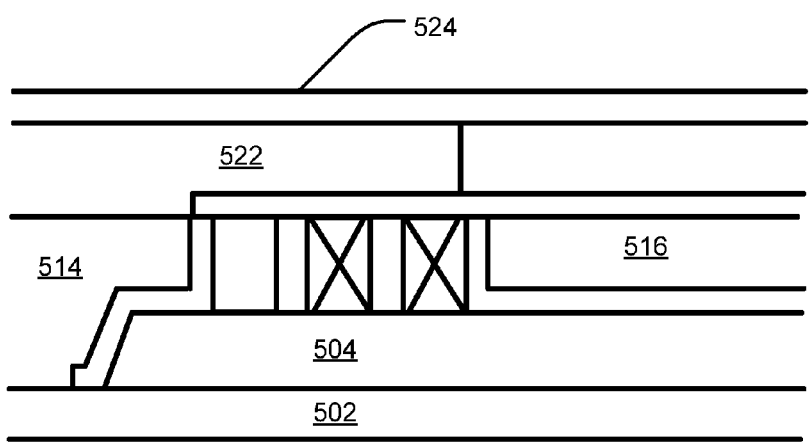

A thin insulating or dielectric layer 520 (e.g., $Al_2O_3$) is deposited and patterned in FIG. 5H. This layer 514 has the reduced thickness (i.e., less than 300 nm) between the eventual coil structure and the eventual yoke. In FIG. 5I, layer 522, which will be the eventual yoke, and layer 524, which will be the eventual main pole or write pole, are shown.

Prior to the process described herein and schematically illustrated in FIGS. 5A through 5I, previously used CMP (chemical-mechanical polishing) processes were not able to obtain the thin dielectric layer 520. In past designs, the coil structure was patterned and backfilled with a thin dielectric (e.g., alumina) layer to fill the space between the coil turns, and the back via was then plated much thicker than the coil structure layer followed by a coil/via backfill process. The resulting deposition thickness of the backfill material was just thicker than the desired final CMP thickness. The dielectric and back via layers were then CMP'ed to a desired target enabled by a patterned amorphous carbon stop layer. After the CMP process, the yoke and main pole were patterned. Thus, it was the CMP process of the coil/via backfill dielectric material that determined the dielectric spacing between the coil structure and the yoke.

Another implementation of this disclosure is a reduced upper core dimension, with the thickness of the dielectric material (e.g., $Al_2O_3$) between the trailing side coil structure and main pole (or trailing side yoke, if present) being no more than 350 nm. FIGS. 6A to 6F schematically illustrate a general process to form a write head having a reduced dimension upper core. Various layers of material are sequentially applied (e.g., deposited) and removed (e.g., patterned, etched, milled, etc.) to form the desired features; in general, the process is done in a generally bottom to top sequence, with the lower features (e.g., the main pole or write pole) formed before upper or higher features (e.g., the coil structure).

Figure 6A:
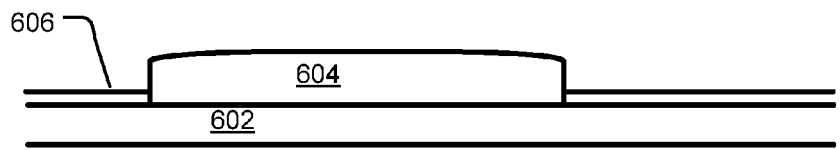
FIG. 6A through 6F are schematic cross-sectional side views of a stepwise process for making an example write head having reduced dimensions on the trailing or top side.

Turning to FIG. 6A, a magnetic layer 602 is provided that will form the write pole or main pole. Although not illustrated in FIG. 6A and the subsequent figures, present below (on the leading side) of the write pole are other elements such as the leading side yoke and leading side coil structure. For those implementations where a trailing yoke is present, a layer 604 is provided that will form the trailing yoke. A dielectric 606 is present over and in contact with the main pole where the trailing yoke is not present.

Figure 6B:
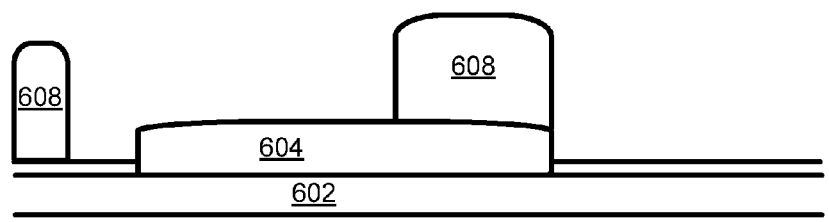
Figure 6C:
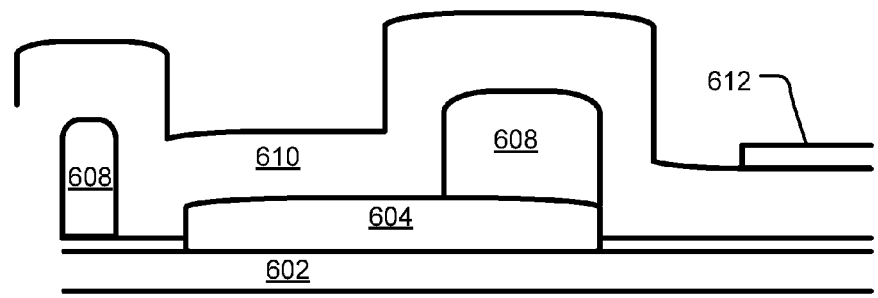
Figure 6D:
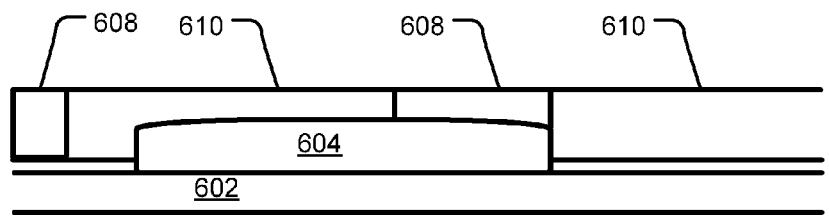
Figure 6E:
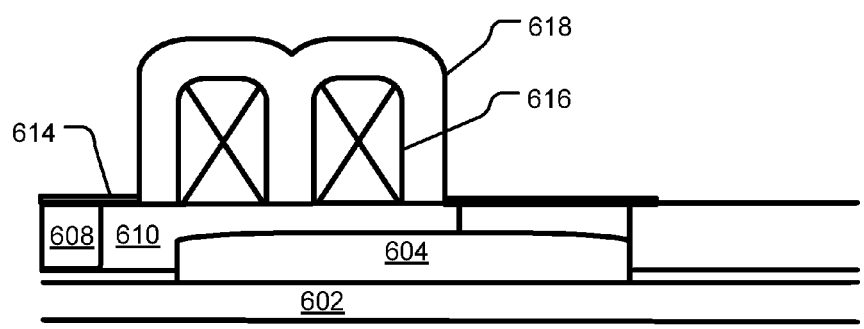
Figure 6F:
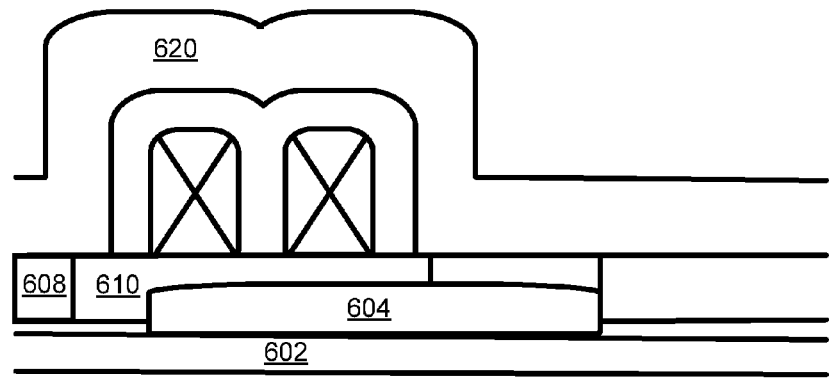

Shown in FIG. 6B, a material 608 that will form the front shield is patterned thicker than its required design target. If the design is a yoke-on-top of main pole (i.e., having layer 604) then layer 604 is also be patterned at this time just prior to the front shield. Next, as shown in FIG. 6C, the front shield layer 608 is backfilled with a dielectric (e.g., alumina) layer 610 with thickness just thicker than the desired final CMP thickness. A stop layer 612 (e.g., amorphous carbon) is patterned on the wafer plane associated with the desired front shield target thickness. In FIG. 6D, layer 610 and front shield layer 608 are planarized (e.g., CMP'ed) to the target (i.e., less than 350 micrometers) enabled by a patterned stop layer (e.g., amorphous carbon). In FIG. 6E, another stop layer 614 (e.g., amorphous carbon) is applied, along with upper coil structure plating seed layer 616 and upper coil structure capping alumina layer 618. Stop layer 614 is patterned to protect the thickness of front shield layer 608 from subsequent process etches, e.g., such as the upper coil structure plating seed 616 mill and upper coil structure capping alumina 618 mill. Next, as seen in FIG. 6F, the stop layer 614 is removed so upper return pole 620 is patterned.

Prior to the process described herein and schematically illustrated in FIGS. 6A through 6F, previously used CMP (chemical-mechanical polishing) processes were not able to obtain the thin dielectric layer 610. In past designs, the front shield was patterned thicker than its required design target. If the design included a trailing yoke on top of the main pole, then it too was patterned at this time. Next, the front shield was backfilled with a thick dielectric layer to a thickness just thicker than the desired final CMP thickness. After completion of the CMP process, the coil structure was deposited and patterned. Thus, it was the CMP process of the front shield/backfill material that determined the dielectric spacing between the coil structure and the yoke or main pole.

Figure 7:
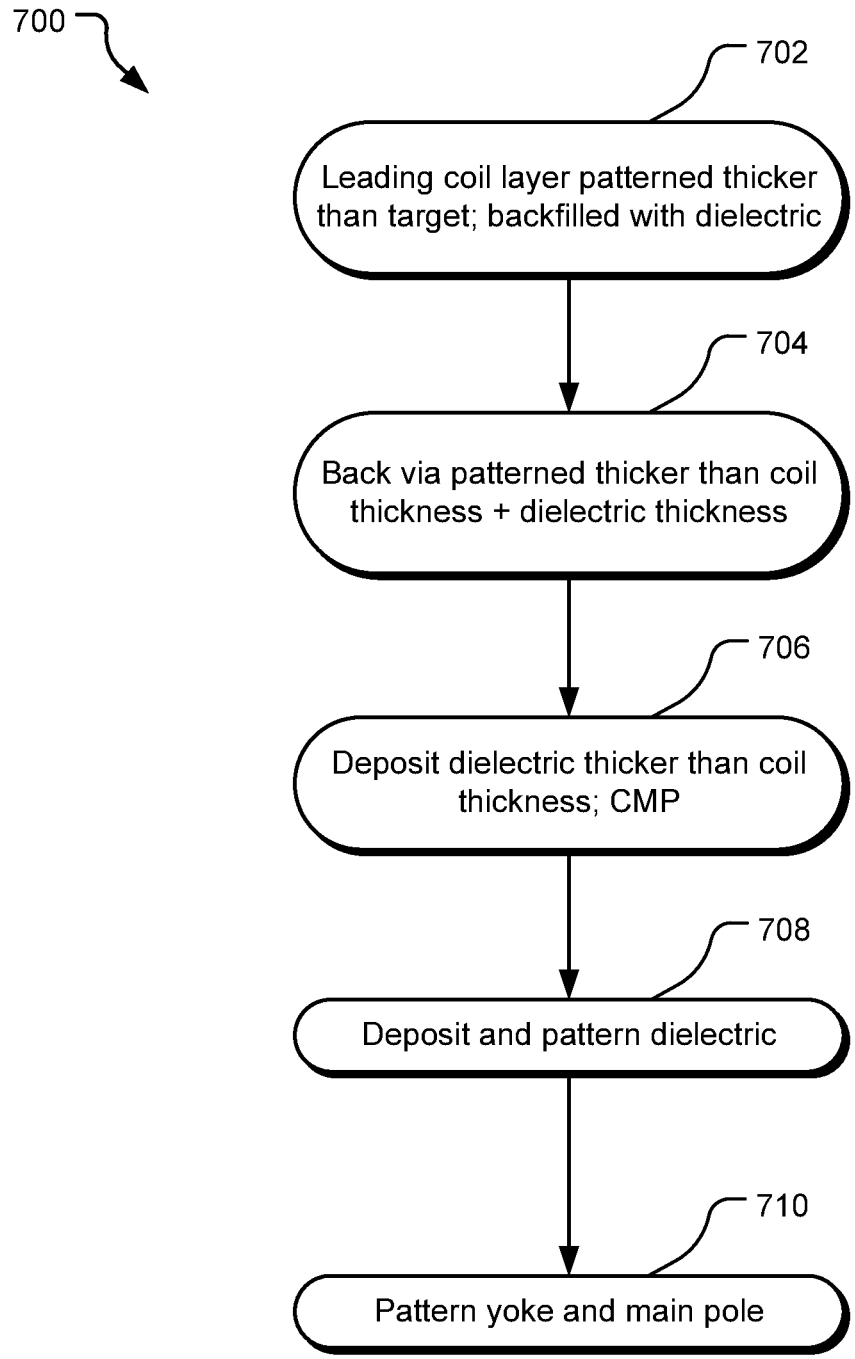
FIG. 7 is a block diagram of an example process for forming an example write head with reduced dimensions on the leading side.

FIG. 7 illustrates an example process 700 for fabrication of a write head as disclosed herein. Specifically, the operations disclosed in FIG. 7 may be used for fabrication of a write head having reduced dimensions between the lower coil structure and the yoke.

First in process 700 as operation 702, the leading coil layer is patterned thicker than its design target requires and then backfilled with dielectric (e.g., alumina) to fill the turns. In operation 704, a leading side back via is patterned to a thickness greater than the sum of the leading coil target thickness and the dielectric thickness between the return pole (RP1) and leading coil. In operation 706, additional dielectric is deposited to a thickness just greater than the leading coil targeted thickness and CMP'ed with a patterned amorphous carbon layer. After this operation 706, the coil structure, back via and dielectric are all exposed at the CMP'ed surface. In operation 708, a thin dielectric layer is deposited and patterned; this layer now creates the dielectric thickness between the coil 1 and the yoke/main pole. In operation 710, the yoke/main pole are patterned.

Figure 8:
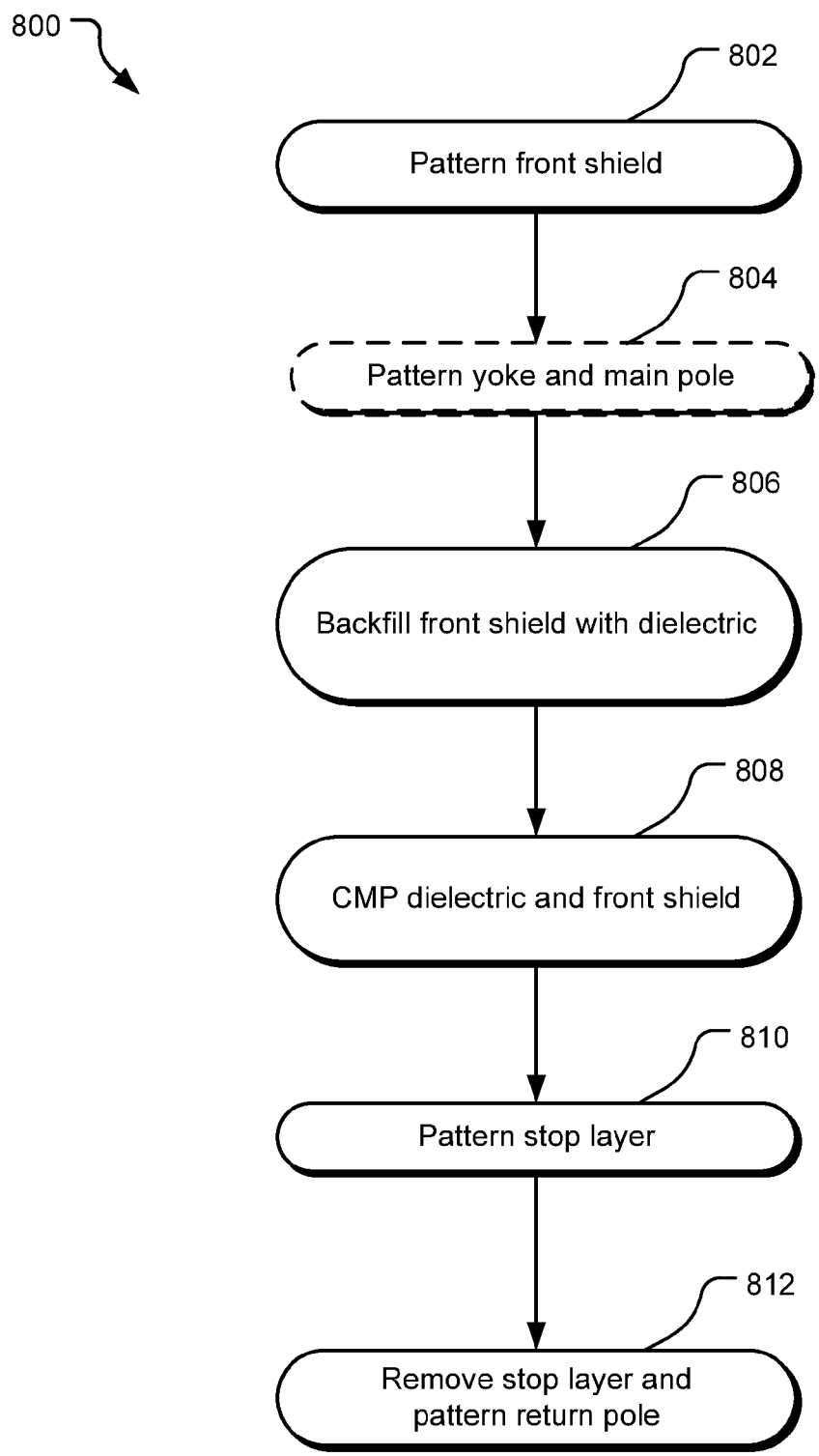
FIG. 8 is a block diagram of an example process for forming an example write head with reduced dimensions on the trailing side.

FIG. 8 illustrates an example process 800 for fabrication of a write head as disclosed herein. Specifically, the operations disclosed in FIG. 8 may be used for fabrication of a write head having reduced dimensions between the upper coil structure and the main pole or yoke.

First in process 800 as operation 802, the front shield is patterned thicker than its required design target. If the design included a yoke-on-top of main pole then it too would be patterned at this time as operation 804. Next in operation 806, the front shield is backfilled with a dielectric layer to a thickness just thicker than the desired final CMP thickness. In operation 808, the dielectric and front shield layers are CMP'ed to the target thickness. In operation 810, an amorphous carbon stop layer is patterned to protect the compressed core front shield thickness from getting attacked by subsequent process etches, such as the coil seed mill and coil capping mill. In operation 812, the amorphous carbon stop layer is removed to pattern the return pole.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A write head configured for use with a storage medium, comprising:
    a main pole having a leading side and a trailing side configured to engage the medium after the leading side has engaged the medium;
    a leading yoke on the leading side of the main pole;
    a leading return pole on the leading side of the leading yoke; and
    a coil structure present between the leading return pole and the leading yoke, the coil structure and the leading yoke having a distance of no greater than 300 nm therebetween, and the coil structure and the main pole having a distance of no greater than 350 nm therebetween.

2. The write head of claim 1, wherein the coil structure and the leading yoke have a distance of no greater than 250 nm therebetween, and the coil structure and the main pole have a distance of no greater than 300 nm therebetween.

3. The write head of claim 1, wherein the coil structure and the leading yoke have a distance of no greater than 200 nm therebetween, and the coil structure and the main pole have a distance of no greater than 250 nm therebetween.

4. The write head of claim 1, further comprising an insulating material between the leading yoke and the coil structure, the insulating material having a thickness no greater than 300 nm.

5. The write head of claim 1, wherein the coil structure is a helical coil wrapped around at least the main pole and the leading yoke.

6. The write head of claim 1, wherein the coil structure comprises planar coils.

7. A write head configured for use with a storage medium, comprising:
    a main pole having a leading side and a trailing side configured to engage the medium after the leading side has engaged the medium;
    a leading yoke on the leading side of the main pole;
    a leading return pole on the leading side of the leading yoke;
    an insulating material between the leading yoke and the leading return pole;
    a trailing yoke on the trailing side of the main pole;
    a trailing return pole on a trailing side of the trailing yoke;
    the insulating material also between the trailing yoke and the trailing return pole; and
    a coil structure present between the leading return pole and the leading yoke and between the trailing return pole and the trailing yoke, the coil structure and the leading yoke having a distance of no greater than 300 nm therebetween.

8. The write head of claim 7, further wherein the coil structure and the trailing yoke have a distance of no greater than 350 nm therebetween.

9. The write head of claim 8, wherein the coil structure and the leading yoke have a distance of no greater than 250 nm therebetween, and the coil structure and the trailing yoke have a distance of no greater than 300 nm therebetween.

10. The write head of claim 8, wherein the coil structure and the leading yoke have a distance of no greater than 200 nm therebetween, and the coil structure and the trailing yoke have a distance of no greater than 250 nm therebetween.

11. The write head of claim 7, wherein the coil structure is a helical coil wrapped around the leading yoke, the main pole, and the trailing yoke.

12. The write head of claim 7, wherein the coil structure comprises planar coils.

13. The write head of claim 7, wherein the coil structure has at least two active turns between the leading return pole and the leading yoke.

14. The write head of claim 7, wherein the coil structure has three active turns between the leading return pole and the leading yoke.

15. The write head of claim 7, wherein the coil structure comprises at least two active turns between the trailing return pole and the trailing yoke.

16. The write head of claim 7, wherein the coil structure has at least two active turns and one dummy turn between the leading return pole and the leading yoke.

* * * * *